United States Patent
Cao et al.

(10) Patent No.: US 10,565,525 B2
(45) Date of Patent: Feb. 18, 2020

(54) COLLABORATIVE FILTERING METHOD, APPARATUS, SERVER AND STORAGE MEDIUM IN COMBINATION WITH TIME FACTOR

(71) Applicant: PING AN TECHNOLOGY (SHENZHEN) CO., LTD., Shenzhen (CN)

(72) Inventors: Luyang Cao, Shenzhen (CN); Jianming Wang, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 144 days.

(21) Appl. No.: 15/578,368

(22) PCT Filed: Apr. 6, 2017

(86) PCT No.: PCT/CN2017/079565
§ 371 (c)(1),
(2) Date: Nov. 30, 2017

(87) PCT Pub. No.: WO2018/090545
PCT Pub. Date: May 24, 2018

(65) Prior Publication Data
US 2018/0300648 A1    Oct. 18, 2018

(30) Foreign Application Priority Data
Nov. 15, 2016    (CN) .......................... 2016 1 1005200

(51) Int. Cl.
*G06N 20/00*    (2019.01)
*G06N 5/02*    (2006.01)
*G06Q 30/02*    (2012.01)

(52) U.S. Cl.
CPC ............ *G06N 20/00* (2019.01); *G06N 5/022* (2013.01); *G06Q 30/0201* (2013.01);
(Continued)

(58) Field of Classification Search
None
See application file for complete search history.

(56) References Cited

U.S. PATENT DOCUMENTS 8,943,083 B2 * 1/2015 Aravamudan ........ G06F 16/284
707/758
2011/0238461 A1 * 9/2011 Mulukutla ............. G06Q 10/04
705/7.31
(Continued)

FOREIGN PATENT DOCUMENTS

CN    103235823 A    8/2013
CN    103473354 A    12/2013
(Continued)

OTHER PUBLICATIONS

Gueddar, Taoufiq, and Vivek Dua. "Disaggregation—aggregation based model reduction for refinery-wide optimization." Computers & chemical engineering 35.9 (2011): 1838-1856. (Year: 2011).*
(Continued)

*Primary Examiner* — Daniel T Pellett
(74) *Attorney, Agent, or Firm* — Platinum Intellectual Property LLP

(57) ABSTRACT

A method of collaborative filtering in combination with time factor includes: establishing an exponential smoothing model; acquiring a time period proposed for the exponential smoothing model, the time period includes a plurality of time cycles; acquiring a plurality of user identifiers and user preference degree values of the user identifiers over a specified product during the plurality of time cycles; performing iterative calculations of the user preference degree
(Continued)

values utilizing the exponential smoothing model, and obtaining smoothing results corresponding to the time cycles; generating a sparse matrix utilizing the user identifiers and the smoothing result corresponding to the time cycles, the sparse matrix includes a plurality of user preference degrees to be predicted; acquiring a collaborative filtering model and inputting the smoothing results corresponding to the time cycles into the collaborative filtering model; and training through the collaborative filtering model, calculating and obtaining predictive values of the plurality of user preference degrees to be predicted in the sparse matrix.

12 Claims, 5 Drawing Sheets

(52) U.S. Cl.
CPC ..... *G06Q 30/0202* (2013.01); *G06Q 30/0255* (2013.01); *G06Q 30/0271* (2013.01)

(56) References Cited

U.S. PATENT DOCUMENTS

| | | | |
|---|---|---|---|
| 2014/0279727 A1 | 9/2014 | Baraniuk et al. | |
| 2014/0280251 A1* | 9/2014 | Somekh | G06F 16/9535 707/754 |
| 2015/0039620 A1 | 2/2015 | Ning | |

FOREIGN PATENT DOCUMENTS

| | | |
|---|---|---|
| CN | 104166668 A | 11/2014 |
| CN | 105975483 A | 9/2016 |
| CN | 106530010 A | 3/2017 |
| JP | 2014002562 A | 1/2014 |

OTHER PUBLICATIONS

Australian Office Action dated Oct. 2, 2018 for the corresponding AU patent application.

Author name : Kotomi SEKINEArticle name : Collaborative Filtering Taking Seasonality Into AccountPublication name : Abstracts of The 2014 Fall National Conference of Operations Research Society of Japan (The 34th Business case Exchange Conference) p. : p. 228, 229Conference organizer : Japan Operations Research Literary Society Public service corporation)Issue date : Aug. 24, 2014.

Author name : Takashi HARAArticle title : Improvement on the Function of Product Recommendation is Made, Increasing Sales by 10% by Pointing Out Forgetting to BuyPublication name : Nikkei Computer, JapanPublication number & p. : No. 899, p. 58-61Issuer name : Nikkei Business Publications. Inc.Issue date : Nov. 12, 2015.

International Search Report and Written Opinion for PCT/CN2017/079565 dated Aug. 14, 2017, English portions only.

Office Action issued by Singapore IP Office dated Jun. 24, 2019 for the counterpart Singaporean application.

* cited by examiner

COLLABORATIVE FILTERING METHOD, APPARATUS, SERVER AND STORAGE MEDIUM IN COMBINATION WITH TIME FACTOR

CROSS-REFERENCE TO RELATED APPLICATION

This application claims priority to Chinese Patent Application No. 2016110052001, entitled "COLLABORATIVE FILTERING METHOD AND APPARATUS IN COMBINATION WITH TIME FACTOR" filed on Nov. 15, 2016, the contents of which is expressly incorporated by reference herein in its entirety.

FIELD OF THE INVENTION

The present disclosure relates to the field of computer technology, particularly relates to a collaborative filtering method, an apparatus, a server and a storage medium in combination with time factor.

BACKGROUND OF THE INVENTION

By gathering preferences of users and performing data analyzing and data mining, the accuracy of product information pushing can be effectively improved. In a conventional manner, the user preference degree over certain product is typically established by the user behavior. For example, the user behavior includes: clicking, collecting, purchasing. When a prediction is made to a unknown user preference degree value, a consideration on the factor of time is therefore missing. Suppose that a user purchased certain product one year ago and ceased to purchase the same this year. If a prediction of the user preference degree over the product this year is made according to the preference degree of such product of such user from last year, the prediction result apparently cannot reflect the real case. As such, it is a technical problem to be addressed to, in combination with the factor of time, perform an effective prediction over the user preference degree value of a specified product.

SUMMARY OF THE INVENTION

According to various embodiments of the present disclosure, a method, an apparatus, a server and a storage medium in combination with time factor are provided.

A method of collaborative filtering in combination with time factor includes:

establishing an exponential smoothing model;

acquiring a time period proposed for the exponential smoothing model, the time period includes a plurality of time cycles;

acquiring a plurality of user identifiers and user preference degree values of the user identifiers over a specified product during the plurality of time cycles;

performing iterative calculations of the user preference degree values utilizing the exponential smoothing model, and obtaining smoothing results corresponding to the time cycles;

generating a sparse matrix utilizing the user identifiers and the smoothing result corresponding to the time cycles, the sparse matrix includes a plurality of user preference degrees to be predicted;

acquiring a collaborative filtering model and inputting the smoothing results corresponding to the time cycles into the collaborative filtering model; and training through the collaborative filtering model, calculating and obtaining predictive values of the plurality of user preference degrees to be predicted in the sparse matrix.

An apparatus of collaborative filtering in combination with time factor, which includes:

a model establishing module configured to establish an exponential smoothing model;

an acquiring module configured to acquire a plurality of user identifiers and user preference degree values of the user identifiers over a specified product during a plurality of time cycles;

a smoothing module configured to perform iterative calculations of the user preference degree values utilizing the exponential smoothing model, and obtain smoothing results corresponding to the time cycles;

a matrix generating module configured to generate a sparse matrix utilizing the user identifiers and the smoothing results corresponding to the time cycles, the sparse matrix includes a plurality of user preference degrees to be predicted;

the acquiring module is further configured to acquire a collaborative filtering model; and a first training module configured to input the smoothing results corresponding to the time cycles to the collaborative filtering model; the first training module is configured to train through the collaborative filtering model, and calculating and obtaining predictive values of the plurality of user preference degrees to be predicted.

A server including a processor; and a memory storing instructions, which, when executed by the processor cause the processor to perform steps include:

establishing an exponential smoothing model;

acquiring a time period proposed for the exponential smoothing model, the time period includes a plurality of time cycles;

acquiring a plurality of user identifiers and user preference degree values of the user identifiers over a specified product during a plurality of time cycles;

performing iterative calculations of the user preference degree values utilizing the exponential smoothing model, and obtaining smoothing results corresponding to the time cycles;

generating a sparse matrix utilizing the user identifiers and the smoothing results corresponding to the time cycles, the sparse matrix includes a plurality of user preference degrees to be predicted;

acquiring a collaborative filtering model and inputting the smoothing results corresponding to the time cycles into the collaborative filtering model; and training through the collaborative filtering model, calculating and obtaining predictive values of the plurality of user preference degrees to be predicted in the sparse matrix.

At least one non-transitory computer-readable storage medium storing computer-readable instructions that, when executed by at least one processors, cause the at least one processor to perform steps include:

establishing an exponential smoothing model;

acquiring a time period proposed for the exponential smoothing model, the time period includes a plurality of time cycles;

acquiring a plurality of user identifiers and user preference degree values of the user identifiers over a specified product during a plurality of time cycles;

performing iterative calculations of the user preference degree values utilizing the exponential smoothing model, and obtaining smoothing results corresponding to the time cycles;

generating a sparse matrix utilizing the user identifiers and the smoothing results corresponding to the time cycles, the sparse matrix includes a plurality of user preference degrees to be predicted;

acquiring a collaborative filtering model and inputting the smoothing results corresponding to the time cycles into the collaborative filtering model; and training through the collaborative filtering model, calculating and obtaining predictive values of the plurality of user preference degrees to be predicted in the sparse matrix.

The details of at least one embodiments of the present disclosure will be described with reference to the following drawings and description. Other characteristic, purposes and advantages of the present disclosure will be more apparent from the specification, drawing and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

The present disclosure will be described in details in combination with the accompanying drawings and embodiments such that the purpose, technical solution and advantages of the present disclosure will be more apparent. It should be understood that the particular embodiments are described for the purpose of illustrating as opposed to restricting the present disclosure.

Figure 1:
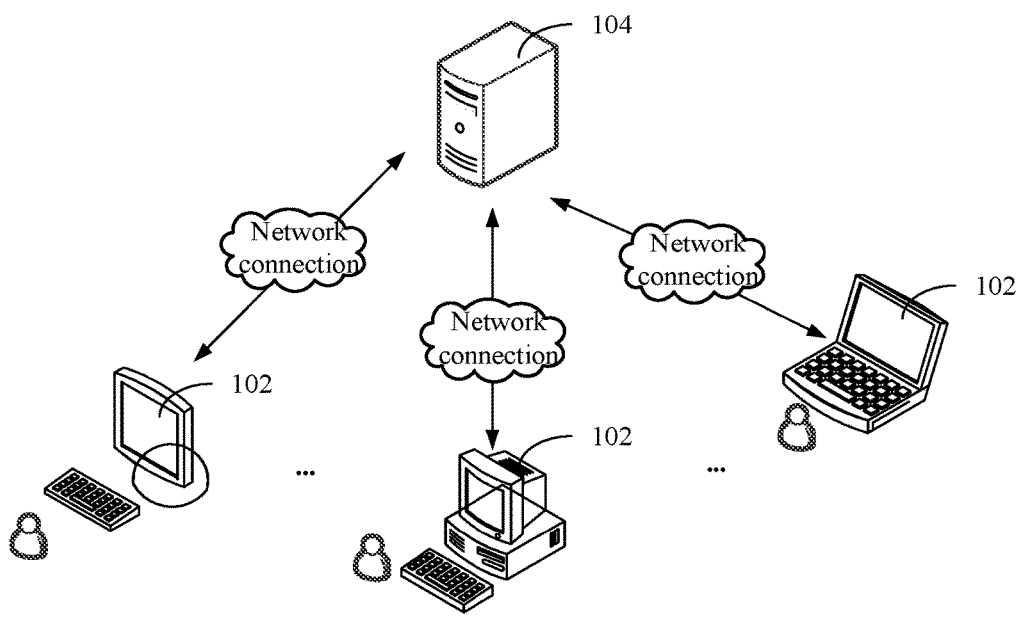
FIG. 1 is a schematic diagram illustrating an application scenario of a method of collaborative filtering in combination with time factor according to an embodiment.

The method of collaborative filtering in combination with time factor according to an embodiment can be applied in an application scenario illustrated in FIG. 1. The terminal 102 and server 104 are connected through network. There can be a plurality of terminals 102. the terminal 102 is installed with an application that can access the server, when a user access the server 104 via the application, the server 104 returns a corresponding page to the terminal 102. The user can click, favorite and purchase etc., the product exhibited on the page. When the user operates through the terminal 102, the server 104 can gather the user identifier and the foregoing user behaviors. The server 104 can obtain a user preference degree value by gathering the user behavior in a preset time cycle with respect to a specified product. The server 104 establishes an exponential smoothing model. The server 104 can propose a corresponding time period for the exponential smoothing model, there can be a plurality of time cycles in the time period. The server 104 acquires a plurality of user identifiers and user preference degree value of the user identifiers over a specified product during a plurality of time cycles. The server 104 inputs the user preference degree value corresponding to a plurality of time cycles into the exponential smoothing model, performs iterative calculations of the user preference degree values during a plurality of time cycles, and obtains smoothing results corresponding to the time cycles. The server 104 generates a sparse matrix utilizing the user identifiers and the smoothing results corresponding to the time cycles, the sparse matrix includes a plurality of user preference degrees to be predicted. The server 104 acquires the collaborative filtering model and inputs the smoothing results corresponding to the time cycles into the collaborative filtering model. By training through the collaborative filtering model, predictive values of the plurality of user preference degrees to be predicted are calculated and obtained.

Figure 2:
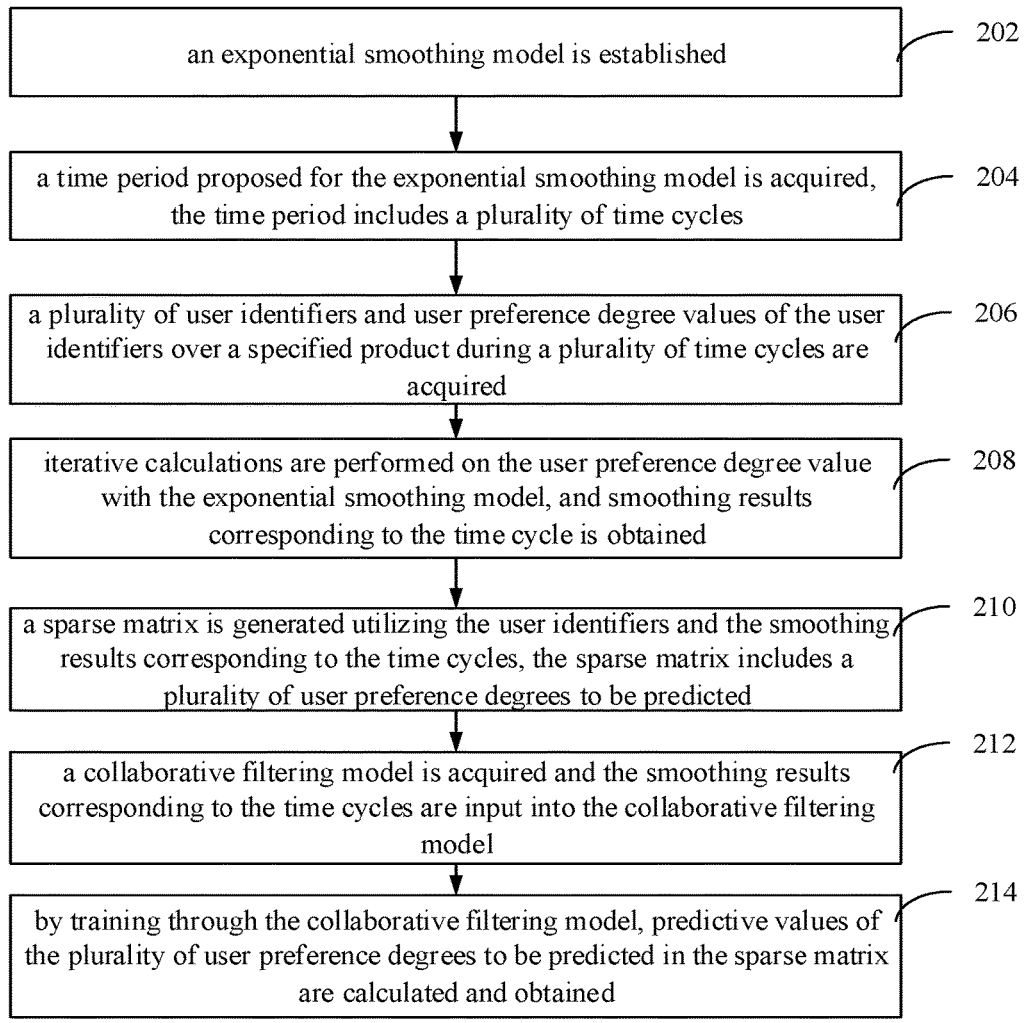
FIG. 2 is a flow chart of a method of collaborative filtering in combination with time factor according to an embodiment.

In an embodiment, as shown in FIG. 2, a method of collaborative filtering in combination with time factor is provided. It should be understood that, although the various steps in the flow chart in FIG. 2 are successively illustrated following the arrows, these steps do not necessarily have to be carried out according to the sequence indicated by the arrows. Unless otherwise described herein, there is no strict sequence restriction of the execution of these steps which can be executed in difference sequences. Also, at least a part of the steps in FIG. 2 can include several sub-steps or several stages that do not necessarily have to be performed at a same time but can be performed at different moments; and they do not necessarily have to be performed successively but can be performed in turn or in alternate with other steps, sub-steps, stages or at least a part thereof. Take the application of the method on a server for example, in particular:

In step S202, an exponential smoothing model is established.

In step S204, a time period proposed for the exponential smoothing model is acquired, the time period includes a plurality of time cycles.

The user preference degree refers to a preference degree of a user over a specified product. The user preference degree can be represented by a value. User preference data is pre-stored on the server. The user preference data includes user identifiers, product identifiers and corresponding user preference degree values. The user preference degree value can be obtained by the server which gathers user behaviors over a specified product in a preset time cycle, user behaviors includes: clicking, purchasing, collecting. The user preference degree corresponds to the time cycle. For different specified products, the time cycles corresponding to the user preference degrees can be the same or otherwise different. For example, for game products, the time cycles corresponding to the user preference degrees can be a date.

For insurance products, the time cycles corresponding to the user preference degrees can be a month or a month and.

For the purpose of an effective combination of the user preference degree over a specified product with the factor of time, the exponential smoothing model is established by the server. Through the exponential smoothing model, user preference degrees of a plurality of time cycles are fused.

In an embodiment, the formula of the exponential smoothing model includes $P_{t+1}=a*P_t+(1-a)*P_{t-1}$, where a is an exponential coefficient corresponding to a product identifier; $P_{t+1}$ is the user preference degree value corresponding to the next time cycle; $P_t$ is the user preference degree value corresponding to the current time cycle; and $P_{t-1}$ is the user preference degree value corresponding to the last time cycle.

The server can propose a corresponding time period for the exponential smoothing model, there can be several time cycles in the time period. The time period can be proposed according to the characteristics of the specified product, and different specified products can be proposed with different time periods. For example, the time period proposed for the exponential smoothing model of a finance product can be a month, the time cycle in such time period can be measured by days. The time period proposed for the exponential smoothing model of an insurance product can be a year, the time cycle in such time period can be measured by months.

Different specified products can correspond to different exponential coefficients. The exponential coefficient can reflect the significance of the influence by a time cycle over a user preference degree. The greater the exponential coefficient, the greater the significance of the influence by the time cycle over the user preference degree. The closer between time cycles, the greater the influence over the user preference degree.

In step S206, a plurality of user identifiers and user preference degree values of the user identifiers over a specified product during a plurality of time cycles are acquired.

The time period proposed by the server for the exponential smoothing model includes several time cycles, the server acquires a plurality of user identifiers and user preference degree values of the user identifiers over a specified product during the plurality of time cycles. The user preference degree values of the user identifiers over a specified product during the plurality of time cycles can be the user preference degree value of one user, or user preference degree values of several users.

In step 208, iterative calculations are performed on the user preference degree value with the exponential smoothing model, and smoothing results corresponding to the time cycle is obtained.

The server inputs the user preference degree value corresponding to several time cycles into the exponential smoothing model, performs iterative calculations of the user preference degree values during several time cycles, and obtains several smoothing results corresponding to the time cycles. In particular, the server acquires an exponential coefficient corresponding to the exponential smoothing model according to the product identifier. The server multiplies the user preference degree value corresponding to the first time cycle in the proposed time period with the exponential coefficient and uses the product as an initial value of the exponential smoothing model, the initial value can also be called smoothing results corresponding to the first time cycle. The performs iterative calculations with the smoothing results corresponding to the first time cycle, the user preference degree value corresponding to the second time cycle and the exponential coefficient inputting exponential smoothing model, and obtains smoothing results corresponding to the second time cycle. Similarly, the server calculates to obtain smoothing results corresponding to several time cycles.

Assuming that the specified product is product 1, the time cycle is one day, the exponential coefficient in the smoothing exponential model is 0.3, the proposed time period is 4 days, and now the user preference degree value of day 5 is required to be predicted. Firstly, respective iterative calculation to the user preference degree values over the previous 4 days should be performed using the exponential smoothing model, the corresponding smoothing results obtained are as follows in Table 1:

TABLE 1

| Time cycles | Day 1 | Day 2 | Day 3 | Day 4 |
| --- | --- | --- | --- | --- |
| User preference degree values | (8) | (9) | (7) | (3) |
| Smoothing results | (2.4) | (4.38) | (4.566) | (4.096) |

The smoothing results of the first day is: 0.3*8=2.4; the smoothing result of the second day is: 0.3*9+(1−0.3)*2.4=4.38; the smoothing result of the third day is: 0.3*5+(1−0.3)*4.38=4.566; The smoothing result of the fourth day is: 0.3*3+(1−0.3)*4.566=4.096. Through the exponential smoothing model, the user preference degree value over a specified product is thereby fused with the factor of time.

In step S210, a sparse matrix is generated utilizing the user identifiers and the smoothing results corresponding to the time cycles, the sparse matrix includes a plurality of user preference degrees to be predicted.

The server generates a sparse matrix where the user identifiers correspond to the product identifiers utilizing the user identifiers and the smoothing results corresponding to the time cycles. The sparse matrix includes several user identifiers and one product identifier, or otherwise includes several user identifiers and several product identifiers. The coefficient matrix includes known user preference degree values and unknown user preference degree values. unknown user preference degree values are the predictive values of user preference degrees to be predicted In the sparse matrix, the predictive values of user preference degrees to be predicted can be represented by preset characters, such as "?". For example, the row in the sparse matrix is product identifiers, the column is user identifiers, the values in the sparse matrix are user preference degree values of a user over a product, shown in Table 2 as follows:

|  | Product identifier 1 | Product identifier 2 | Product identifier 3 | Product identifier 4 |
| --- | --- | --- | --- | --- |
| User identifier 1 | (47.46) | (83.17) | (78.69) | (78.51) |
| User identifier 2 | (32.47) | (25.12) | (91.37) | (64.43) |
| User identifier 3 | (67.58) | ? | (55.45) | ? |
| User identifier 4 | ? | (24.80) | (44.13) | (57.71) |
| User identifier 5 | (48.31) | ? | (61.97) | (85.53) |

As the user preference degree values in the sparse matrix are smoothing results corresponding to the time cycles, the sparse matrix is also effectively fused with the time factor. When it is required to predict unknown user preference degree value in a next time cycle, the server acquires the product identifier, user identifier and the smoothing results of user preference degree values in the present time cycle to generate the sparse matrix where the user identifier and product identifier correspond.

In step S212, a collaborative filtering model is acquired and the smoothing results corresponding to the time cycles are input into the collaborative filtering model.

In step S214, by training through the collaborative filtering model, predictive values of the plurality of user preference degrees to be predicted in the sparse matrix are calculated and obtained.

The collaborative filtering model can be a conventional collaborative filtering model. The server acquires the collaborative filtering model and inputs the smoothing results corresponding to the time cycles into the collaborative filtering model. By training through the collaborative filtering model, predictive values of the plurality of user preference degrees to be predicted are calculated and obtained.

In particular, when an unknown user preference degree value in a next time cycle is to be predicted, the server acquires smoothing results of several user identifiers in the last time cycle and inputs the same to the collaborative filtering model. By training through the collaborative filtering model, predictive values of the plurality of user preference degrees to be predicted in the sparse matrix where the user identifier and product identifier correspond and over the next time cycle are calculated and obtained.

The server inputs the user preference degree value corresponding to several time cycles into the exponential smoothing model, performs iterative calculations of the user preference degree values during several time cycles, and obtains several smoothing results corresponding to the time cycles. When a unknown user preference degree value in a next time cycle is to be predicted, a sparse matrix can be generated utilizing the user identifiers and smoothing results corresponding to the time cycles, input the smoothing results corresponding to the time cycles to the collaborative filtering model, training is performed through the collaborative filtering model, and predictive values of the plurality of user preference degrees to be predicted in the sparse matrix are calculated and obtained. As the smoothing results input to the collaborative model are fused with the time factor, time factor relevant user preference degree value over a specified product can be predicted. An effective prediction over the user preference degree value of a specified product and combining the time factor is implemented.

In an embodiment, after predictive values of the plurality of user preference degrees to be predicted in the sparse matrix are calculated and obtained, the method further includes: acquiring a dimension corresponding to the user preference degree value; collecting statistics of the user preference degree values in a plurality of dimensions according to the user identifiers; regularizing a statistical result and obtaining a multi-dimensional vector corresponding to the user identifiers; and calculating the similarity degree of user preferences between the user identifiers according to the multi-dimensional vector.

In the present embodiment, after the corresponding predictive values of the plurality of user preference degrees to be predicted in the sparse matrix are calculated by the server, a similarity calculation of known and predicted user preference degree values can be performed to obtain a plurality of user identifiers with similar user preference degrees.

Figure 3:
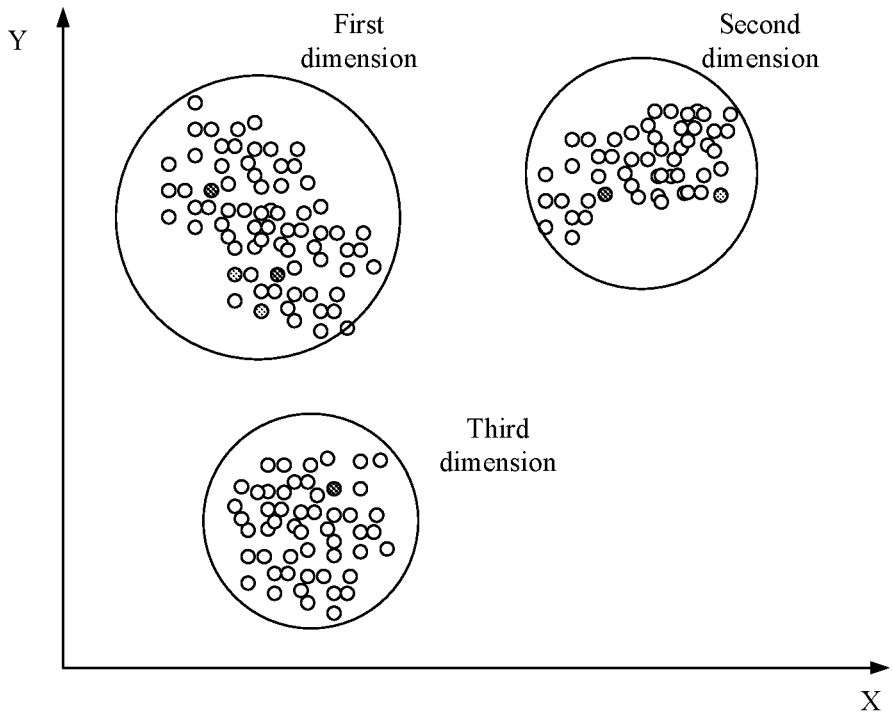
FIG. 3 is a schematic diagram of record points in a two-dimensional space according to an embodiment.

The server can use the product identifier as the dimension corresponding to the user preference degree value. Different product identifiers are different dimensions. The user preference degree value can be regarded as record points scattered in the space. Taking a two dimensional space map for example, as illustrated in FIG. 3, each record point can be represented by longitude and latitude. The X axis can be the latitude, the Y axis can be the longitude. Suppose that the record point of the user preference degree value of user identifier 1 is noted by a black dot in FIG. 3, and the record point of the user preference degree value of user identifier 2 is noted by a gray dot in FIG. 3. There are four record dots of user identifier 1 and three record dots of user identifier 2. As the longitudes and latitudes of each of the record points are different, a similarity degree comparison cannot be performed directly. If a comparison is performed with the average point composed of the latitude average and the longitude average, the average point has apparently deviated from the user record point and cannot represent the actual user preference degree value.

To perform an effective comparison of the user preference degree value, the server clusters all the record points, for example, the server can adopt KMeans algorithm (a clustering algorithm) to perform clustering and obtain several classes. Each of the classes has a corresponding dimension. Each of the classes includes user preference degree value record points corresponding to several user identifiers.

The server collects statistics of the user preference degree value in a plurality of dimensions according to the user identifiers and obtains the statistical result of the user preference degree value. The server regularizes the statistical result to obtain a multi-dimension vector corresponding to the user identifier, calculates the similarity distance between the user identifiers according to the multi-dimension vector, and uses the similarity distance as the similarity degree of user preferences.

Description will now be made taking the record points corresponding to the user identifier 1 and user identifier 2 in FIG. 3 as an example. The server clusters the record points in FIG. 3 to obtain three dimensions. The user identifier 1 has two record points in the first dimension, 1 record point in the second dimension and 1 record point in the third dimension. The user identifier 2 has two record points in the first dimension, 1 record point in the second dimension and 0 record point in the third dimension. The server collects the statistics that the number of the user preference degree value record points corresponding to user identifier 1 is four in total, and the number of the user preference degree value record points corresponding to user identifier 2 is three in total. The server regularizes the statistical result and obtains a multi-dimensional vector (2/4, 1/4, 1/4) corresponding to the user identifier 1; and a multi-dimensional vector (2/4, 1/4, 1/4) corresponding to the user identifier 1. The similarity distance between the user identifier 1 and user identifier 2 is calculated according to the multi-dimension vectors, and takes the similarity distance as the user preference similarity degree. There can be various ways of similarity distance calculation, such as calculating the similarity distance using an Euclidean distance calculation.

By calculating the user preference similarity between user identifiers, users with similar user preferences can thus be effectively extracted from massive users, thereby facilitating the pushing of messages and the predicting of consumption tendency toward users with similar user preferences.

In an embodiment, the method further includes: acquiring positive samples and negative samples corresponding to the user preference degree values according to product identifiers and user identifiers; splitting the negative samples, and obtaining a plurality of split negative samples, a difference between a number of split negative samples and a number of positive samples is within a preset range; acquiring a disaggregated model, training the disaggregated model utilizing the positive samples and the split negative samples, and obtaining a plurality of trained disaggregated models; and fitting the plurality of trained disaggregated models and calculating and obtaining a disaggregating weight corresponding to each trained disaggregated model.

In the present embodiment, the server can acquire positive samples and negative samples corresponding to the user preference degree values according to product identifiers and user identifiers. The positive samples represent that the user likes a product while the negative samples represent that the user dislikes a product. for example, the positive sample is user 1 likes iPhone 7 (a kind of mobile phone), while the negative sample is the user 2 dislikes iPhone 7. The user preference degree value includes known user preference degree values and predicted user preference degree values. The server can use known user preference degree value for disaggregated training, or use known user preference degree values and predicted user preference degree values for disaggregated training.

Both positive samples and negative samples can be referred as samples. Corresponding sample data is pre-stored on the server, the sample data includes user characteristic data and product characteristic data. The user characteristic data includes the age and gender of a user and the product characteristic data includes the product identifier and the product type.

Typically, when a new product is released, the number of users liking the new product is far less than the number of users disliking the new product. As such, the number of positive samples is far less than the number of negative samples of a user toward a product.

There are mainly two ways of conventional disaggregated training. The first conventional way is to perform under-sampling to the negative samples and obtain a number of negative samples equivalent to the number of positive samples, and perform the disaggregated training with the under-sampled negative samples and the positive samples. Still, the under-sampled negative samples are only a small portion of data in the negative samples, the total sample data is not completely utilized, which results in an inaccurate disaggregated model. The second conventional way is to duplicate the positive samples to cause the number of positive samples to be generally even to the number of the negative samples. Although no extra sample information is introduced in the second conventional way, yet, as the number of negative samples is far greater than the number of positive samples, after the positive sample duplication, the data volume to be calculated is caused to be exploded, the calculation load of the server is thereby increased.

For the purpose of effectively addressing the problems of the insufficient utilization of sample data and the server calculation overload caused by utilizing the total sample data, a new disaggregated training manner is provided in the present embodiment.

In particular, the server acquires positive samples and negative samples corresponding to the user preference degree values according to product identifiers and user identifiers. The server splits the negative samples according to the number of the positive samples. The difference between number of split negative samples and the number of positive samples is within a preset range. The number of split negative samples and the number of positive samples are equal or close. The server acquires a disaggregated model, the disaggregated model can be a conventional disaggregated model. The server inputs each split negative sample and positive sample into the disaggregated model for training and obtains a trained disaggregated model that has the same number as the split negative samples.

The server acquires a regression model, which can be a conventional regression model. The server inputs the output of several trained disaggregate model into the regression model and thereby fits the plurality of trained disaggregated models and calculating and obtaining a disaggregating weight corresponding to each trained disaggregated model. In the entire process, not only the total present sample data are sufficiently utilized, the data to be calculated is also not exploding, the calculation load of the server is therefore effectively relieved.

In one of the embodiment, after the step of calculating and obtaining the disaggregating weight corresponding to the trained disaggregated model, the method further includes: acquiring sample data to be disaggregated; and disaggregating the sample data to be disaggregated utilizing the trained disaggregated models and the disaggregating weight.

The server can acquire sample data to be disaggregated, input the sample data to be disaggregated into the trained disaggregated model, respectively, and disaggregate the sample data to be disaggregated utilizing each trained disaggregated model and disaggregating weight. As such, a swift and effective disaggregation can be performed to the sample data to be disaggregated.

Figure 4:
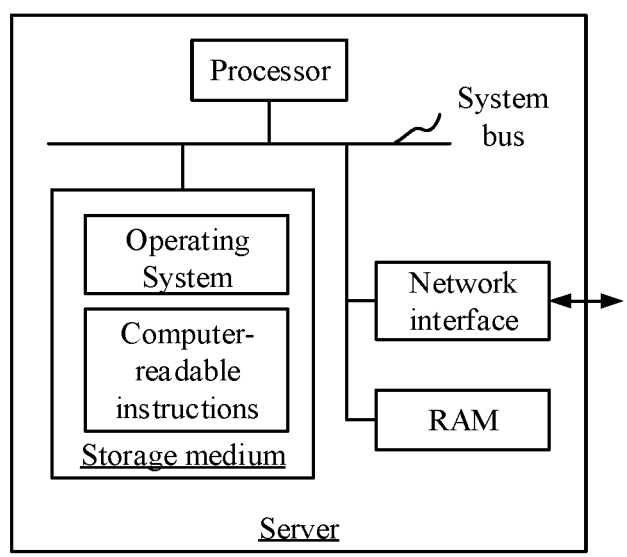
FIG. 4 is a block diagram of a server according to an embodiment.

In an embodiment, as shown in FIG. 4, a server is provided which includes a processor connected through the system bus, a non-transitory storage medium, a memory device and a network interface. An operating system and computer readable instructions are stored in the non-transitory storage medium of the server, computer readable instructions are configured to implement a collaborative filtering method in combination with time factor. The processor is configured to provide calculation and control capability to support the operation of the entire server. The network interface is configured for communication with external terminals through network communication therethrough. The server can be an independent server or be implemented by way of a server group composed of a plurality of servers. A person skilled in the art should understand, FIG. 4 is exemplary to show the structure of the terminal in accordance with an embodiment of the present disclosure and does not limit the server to the embodiment; in other embodiments, compared with the structure shown in FIG. 4, the particular server may include more or less components, be configured with other components not shown in FIG. 4, or have a different configuration.

Figure 5:
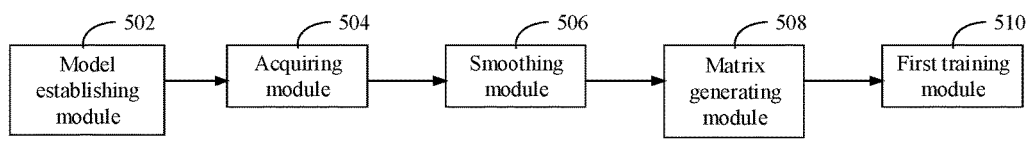
FIG. 5 is a block diagram of an apparatus of collaborative filtering in combination with time factor according to an embodiment.

In an embodiment, as shown in FIG. 5, a collaborative filtering apparatus in combination with time factor is provided, which includes: a model establishing module 502, an acquiring module 504, a smoothing module 506, a matrix generating module 508 and a first training module 510:

The model establishing module 502 is configured to establish an exponential smoothing model.

An acquiring module 504 configured to acquire a time period proposed for the exponential smoothing model, the time period includes a plurality of time cycles; and to acquire a plurality of user identifiers and user preference degree values of the user identifiers over a specified product and during a plurality of time cycles.

A smoothing module 506 configured to perform iterative calculations of the user preference degree values utilizing the exponential smoothing model, and obtain smoothing results corresponding to the time cycles.

A matrix generating module 508 configured to generate a sparse matrix utilizing the user identifiers and the smoothing results corresponding to the time cycles, the sparse matrix includes a plurality of user preference degrees to be predicted.

The acquiring module 504 is further configured to acquire a collaborative filtering model.

The first training module 510 is configured to input the smoothing results corresponding to the time cycle to the collaborative filtering model; The first training module 510 is configured to train through the collaborative filtering model, and calculate and obtain predictive values of the plurality of user preference degrees to be predicted.

In an embodiment, the formula of the exponential smoothing model is as follows.

$$P_{t+1}=a*P_t+(1-a)*P_{t-1};$$

a is an exponential coefficient corresponding to a product identifier; $P_{t+1}$ is the user preference degree value corresponding to the next time cycle; $P_t$ is the user preference degree value corresponding to the current time cycle; and $P_{t-1}$ is the user preference degree value corresponding to the last time cycle.

In an embodiment, the acquiring module 504 is further configured to acquire a dimension corresponding to the user preference degree value; as shown in FIG. 5, the apparatus further includes: a statistics collecting module 512, a regularization module 514 and a similarity calculation module 516.

The statistics collecting module 512 is configured to collect statistics of user preference degree values in a plurality of dimensions according to the user identifiers.

The regularization module 514 is configured to regularize a statistical result and obtaining multi-dimensional vectors corresponding to user identifiers.

The similarity statistics collecting module 516 is configured to calculate the similarity degree of user preferences between the user identifiers according to the multi-dimensional vectors.

Figure 6:
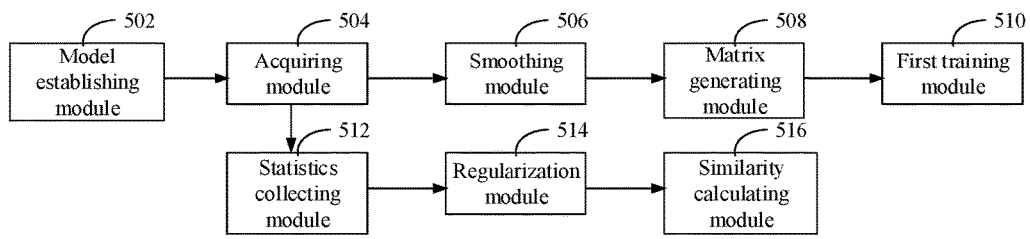
FIG. 6 is a block diagram of an apparatus of collaborative filtering in combination with time factor according to another embodiment.

In an embodiment, the acquiring module 504 is further configured to acquire positive samples and negative samples corresponding to the user preference degree values according to the product identifiers and user identifiers; as shown in FIG. 6, the apparatus further includes a splitting module 518, a second training module 520 and a fitting module 522:

The splitting module 518 is configured to split the negative samples, and obtaining a plurality of split negative samples, a difference between a number of split negative samples and a number of positive samples is within a preset range;

The acquiring module 504 is further configured to acquire a disaggregated model.

The second training module 520 is configured to train the disaggregated model utilizing the positive samples and the split negative samples, and obtaining a plurality of trained disaggregated models.

The fitting module 522 is configured to fit the plurality of trained disaggregated models and calculate and obtain a disaggregating weight corresponding to each trained disaggregated model.

Figure 7:
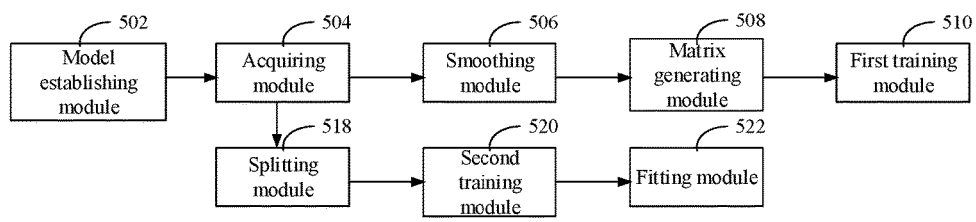
FIG. 7 is a block diagram of an apparatus of collaborative filtering in combination with time factor according to yet another embodiment.
Figure 8:
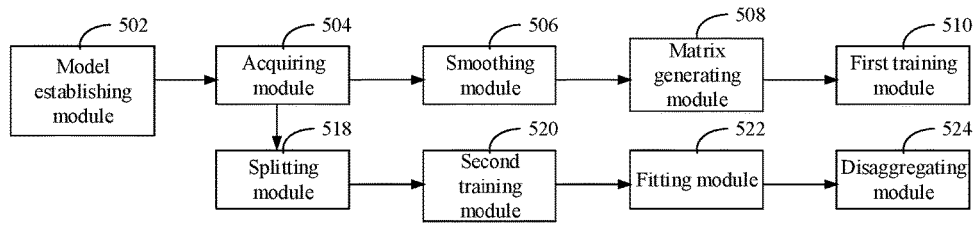
FIG. 8 is a block diagram of an apparatus of collaborative filtering in combination with time factor according to yet another embodiment.

In an embodiment, the acquiring module 504 is further configured to acquire disaggregated sample data; as shown in FIG. 7, the apparatus further includes: disaggregating module 524 configured to disaggregate the sample data to be disaggregated utilizing the trained disaggregated model and disaggregating weight.

The various modules of the foregoing collaborative filtering apparatus in combination with time factor can be implemented, in part or as a whole, by software, hardware or the combinations thereof. The foregoing modules can be embedded in or independent from the processor of a base station and in the form of hardware, or be stored in a memory of base station and in the form of software, so as to facilitate the processor to call and execute corresponding operations of the foregoing various modules. The processor can be a CPU or a microprocessor etc.

In an embodiment, at least one non-transitory storage medium storing computer-readable instructions is provided, the computer-readable instructions are executed by at least one processor to perform the step as follows.

establishing an exponential smoothing model;

acquiring a time period proposed for the exponential smoothing model, the time period includes a plurality of time cycles;

acquiring a plurality of user identifiers and user preference degree values of the user identifiers over a specified product during a plurality of time cycles;

performing iterative calculations of the user preference degree values utilizing the exponential smoothing model, and obtaining smoothing results corresponding to the time cycles;

generating a sparse matrix utilizing the user identifiers and the smoothing results corresponding to the time cycles, the sparse matrix includes a plurality of user preference degrees to be predicted;

acquiring a collaborative filtering model and inputting the smoothing results corresponding to the time cycles into the collaborative filtering model; and training through the collaborative filtering model, calculating and obtaining predictive values of the plurality of user preference degrees to be predicted in the sparse matrix.

In an embodiment, the formula of the exponential smoothing model is as follows.

$$P_{t+1}=a*P_t+(1-a)*P_{t-1};$$

a is an exponential coefficient corresponding to a product identifier; $P_{t+1}$ is the user preference degree value corresponding to the next time cycle; $P_t$ is the user preference degree value corresponding to the current time cycle; and $P_{t-1}$ is the user preference degree value corresponding to the last time cycle.

In an embodiment, after predictive values of the plurality of user preference degrees to be predicted in the sparse matrix are calculated and obtained, the instructions are further executed by at least one processor to perform: acquiring a dimension corresponding to the user preference degree value; collecting statistics of the user preference degree value in a plurality of dimensions according to the user identifiers; regularizing the statistical result and obtaining multi-dimensional vector corresponding to the user identifiers; and calculating the similarity degree of user preferences between the user identifiers according to the multi-dimensional vector.

In an embodiment, the instructions are further executed by at least one processor to perform: acquiring positive samples and negative samples corresponding to the user preference degree values according to product identifiers and user identifiers; splitting the negative samples, and obtaining a plurality of split negative samples, a difference between a quantity of split negative samples and a quantity of positive samples is within a preset range; acquiring a classification model, training the classification model utilizing the positive samples and the split negative samples, and obtaining a plurality of trained classification models; and fitting the plurality of trained classification models and calculating and obtaining a classification weight corresponding to each trained classification model.

In one of the embodiment, after the step of calculating and obtaining the disaggregating weight corresponding to the trained disaggregated model, the instructions are further executed by at least one processor to perform: acquiring sample data to be disaggregated; and disaggregating the sample data to be disaggregated utilizing the trained disaggregated models and the disaggregating weight.

A person skilled in the art should understand that the processes of the methods in the above embodiments can be, in full or in part, implemented by computer programs instructing underlying hardware, the programs can be stored in a non-volatile computer-readable storage medium, the program can include the processes in the embodiments of the various methods when it is being executed. The storage medium can be a disk, a CD, a Read-Only Memory (ROM).

Although the respective embodiments have been described one by one, it shall be appreciated that the respective embodiments will not be isolated. Those skilled in the art can apparently appreciate upon reading the disclosure of the application that the respective technical features involved in the respective embodiments can be combined arbitrarily between the respective embodiments as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A computer-implemented method of collaborative filtering in combination with time factor for a user preference prediction, comprising:
    establishing, by a server, an exponential smoothing model;
    acquiring, by the server, a time period proposed for the exponential smoothing model, the time period being defined based on a specific product and comprising a plurality of time cycles associated with the specific product;
    acquiring, by the server, a plurality of user identifiers and a plurality of user preference degree values of the plurality of user identifiers over the specified product during the plurality of time cycles, each of the plurality of user preference degree values being associated with one of the plurality of user identifiers, one of the plurality of time cycles, and the specified product;
    performing, by the server, iterative calculations to the plurality of user preference degree values utilizing the exponential smoothing model, and obtaining smoothing results corresponding to the plurality of time cycles;
    generating, by the server, a sparse matrix utilizing the plurality of user identifiers and the smoothing results corresponding to the plurality of time cycles, the sparse matrix comprising a plurality of user preference degrees to be predicted;
    acquiring, by the server, a collaborative filtering model and inputting the smoothing results corresponding to the plurality of time cycles into the collaborative filtering model;
    training, by the server, through the collaborative filtering model, calculating and obtaining predictive values of the plurality of user preference degrees to be predicted in the sparse matrix;
    acquiring positive samples and negative samples corresponding to the plurality of the user preference degree values according to product identifiers and the plurality of the user identifiers;
    splitting the negative samples, and obtaining a plurality of split negative samples, wherein a difference between the number of split negative samples and the number of positive samples is within a preset range;
    acquiring a disaggregated model, training the disaggregated model utilizing the positive samples and the split negative samples, and obtaining a plurality of trained disaggregated models; and
    fitting the plurality of trained disaggregated models and calculating and obtaining a disaggregating weight corresponding to each trained disaggregating model.

2. The computer-implemented method of claim 1, wherein a formula of the exponential smoothing model comprises:

$$P_{t+1}=a*P_t+(1-a)*P_{t-1}$$

wherein a is an exponential coefficient corresponding to a product identifier; $P_{t+1}$ is the user preference degree value corresponding to the next time cycle; $P_t$ is the user preference degree value corresponding to the current time cycle; and $P_{t-1}$ is the user preference degree value corresponding to the last time cycle.

3. The computer-implemented method of claim 1, wherein after calculating and obtaining predictive values of the plurality of user preference degrees to be predicted, the method further comprises:
    acquiring a dimension corresponding to the user preference degree value;
    collecting statistics of the user preference degree value in a plurality of dimensions according to the user identifiers;
    regularizing a statistical result and obtaining a multi-dimensional vector corresponding to the user identifiers; and
    calculating a similarity degree of user preferences between the user identifiers according to multi-dimensional vectors.

4. The computer-implemented method of claim 1, wherein after calculating and obtaining predictive values of the plurality of user preference degrees to be predicted, the method further comprises:
    acquiring sample data to be disaggregated; and
    disaggregating the sample data to be disaggregated utilizing the trained disaggregated models and the disaggregating weight.

5. A server for a user preference prediction comprising a processor; and a memory storing instructions, which, when executed by the processor cause the processor to perform steps comprising:
    establishing, by the server, an exponential smoothing model;
    acquiring, by the server, a time period proposed for the exponential smoothing model, the time period being defined based on a specific product and comprising a plurality of time cycles associated with the specific product;
    acquiring, by the server, a plurality of user identifiers and a plurality of user preference degree values of the plurality of user identifiers over the specified product during the plurality of time cycles, each of the plurality of user preference degree values being associated with one of the plurality of user identifiers, one of the plurality of time cycles, and the specified product;

performing, by the server, iterative calculations to the plurality of user preference degree values utilizing the exponential smoothing model, and obtaining smoothing results corresponding to the plurality of time cycles;

generating, by the server, a sparse matrix utilizing the plurality of user identifiers and the smoothing results corresponding to the plurality of time cycles, the sparse matrix comprising a plurality of user preference degrees to be predicted;

acquiring, by the server, a collaborative filtering model and inputting the smoothing results corresponding to the plurality of time cycles into the collaborative filtering mdel;

training, by the server, through the collaborative filtering model, calculating and obtaining predictive values of the plurality of user preference degrees to be predicted in the sparse matrix;

acquiring positive samples and negative samples corresponding to the user preference degree values according to product identifiers and the user identifiers;

splitting the negative samples, and obtaining a plurality of split negative samples, wherein a difference between the number of split negative samples and the number of positive samples is within a preset range;

acquiring a disaggregated model, training the disaggregated model utilizing the positive samples and the split negative samples, and obtaining a plurality of trained disaggregated models; and fitting the plurality of trained disaggregated models and calculating and obtaining a disaggregating weight corresponding to each trained disaggregating model.

6. The server of claim 5, wherein a formula of the smoothing model comprises:

$$P_{t+1}=a*P_t+(1-a)*P_{t-1};$$

wherein a is an exponential coefficient corresponding to a product identifier; $P_{t+1}$ is the user preference degree value corresponding to the next time cycle; $P_t$ is the user preference degree value corresponding to the current time cycle; and $P_{t-1}$ is the user preference degree value corresponding to the last time cycle.

7. The server of claim 5, wherein after calculating and obtaining predictive values of the plurality of user preference degrees to be predicted in the sparse matrix, the method further comprises:

acquiring a dimension corresponding to the user preference degree value;

collecting statistics of the user preference degree value in a plurality of dimensions according to the user identifiers;

regularizing a statistical result and obtaining a multidimensional vector corresponding to the user identifiers; and calculating a similarity degree of user preferences between the user identifiers according to the multidimensional vectors.

8. The server of claim 5, wherein after calculating and obtaining a disaggregating weight corresponding to each trained disaggregated model, the processor further executes the instructions to provide:

acquiring sample data to be disaggregated; and disaggregating the sample data to be disaggregated utilizing the trained disaggregated models and the disaggregating weight.

9. At least one non-transitory computer-readable storage medium storing computer-readable instructions for a user preference prediction that, when executed by at least one processors, cause the at least one processor to perform steps comprising:

establishing, by the processor, an exponential smoothing model;

acquiring, by the processor, a time period proposed for the exponential smoothing model, the time period being defined based on a specific product and comprising a plurality of time cycles associated with the specific product;

acquiring, by the processor, a plurality of user identifiers and a plurality of user preference degree values of the plurality of user identifiers over the specified product during the plurality of time cycles, each of the plurality of user preference degree values being associated with one of the plurality of user identifiers, one of the plurality of time cycles, and the specified product;

performing, by the processor, iterative calculations to the plurality of user preference degree values utilizing the exponential smoothing model, and obtaining smoothing results corresponding to the plurality of time cycles;

generating, by the processor, a sparse matrix utilizing the plurality of user identifiers and the smoothing results corresponding to the plurality of time cycles, the sparse matrix comprising a plurality of user preference degrees to be predicted; acquiring a collaborative filtering model and inputting the smoothing results corresponding to the time cycles into the collaborative filtering model;

training through the collaborative filtering model, calculating and obtaining predictive values of the plurality of user preference degrees to be predicted in the sparse matrix;

acquiring positive samples and negative samples corresponding to the user preference degree values according to product identifiers and the user identifiers;

splitting the negative samples, and obtaining a plurality of split negative samples, wherein a difference between the number of split negative samples and the number of positive samples is within a preset range;

acquiring a disaggregated model, training the disaggregated model utilizing the positive samples and the split negative samples, and obtaining a plurality of trained disaggregated models; and fitting the plurality of trained disaggregated models and calculating and obtaining a disaggregating weight corresponding to each trained disaggregating model.

10. The storage medium of claim 9, wherein a formula of the smoothing model comprises:

$$P_{t+1}=a*P_t+(1-a)*P_{t-1};$$

wherein a is an exponential coefficient corresponding to a product identifier; $P_{t+1}$ is the user preference degree value corresponding to the next time cycle; $P_t$ is the user preference degree value corresponding to the current time cycle; and $P_{t-1}$ is the user preference degree value corresponding to the last time cycle.

11. The storage medium of claim 9, after calculating and obtaining predictive values of the plurality of user preference degrees to be predicted, the at least one processor further executes the instructions to provide:

acquiring a dimension corresponding to the user preference degree value;

collecting statistics of the user preference degree value in a plurality of dimensions according to the user identifiers;

regularizing a statistical result and obtaining a multidimensional vector corresponding to the user identifiers; and calculating a similarity degree of user preferences between the user identifiers according to the multidimensional vectors.

12. The storage medium of claim 9, wherein after calculating and obtaining a disaggregating weight corresponding to each trained disaggregated model, the at least one processor further executes the instructions to provide:

acquiring sample data to be disaggregated; and disaggregating the sample data to be disaggregated utilizing the trained disaggregated models and the disaggregating weight.

* * * * *